US012806754B2

(12) United States Patent
Cannaliato et al.

(10) Patent No.: US 12,806,754 B2
(45) Date of Patent: Nov. 24, 2026

(54) POWER TOOL HAVING INTERCHANGEABLE TOOL HEADS

(71) Applicant: Black & Decker Inc., New Britain, CT (US)

(72) Inventors: Michael F. Cannaliato; Keith E. McQuaid, Baltimore, MD (US); David A. Miller, Aberdeen, MD (US); Steven J. Phillips, Ellicott City, MD (US); Oleksiy P. Sergyeyenko, Baldwin, MD (US)

(73) Assignee: Black & Decker Inc., New Britain, CT (US)

( * ) Notice: Subject to any disclaimer, the term of this patent is extended or adjusted under 35 U.S.C. 154(b) by 1404 days.

(21) Appl. No.: 17/148,968

(22) Filed: Jan. 14, 2021

(65) Prior Publication Data

US 2021/0170563 A1 Jun. 10, 2021

Related U.S. Application Data

(63) Continuation of application No. 15/665,546, filed on Aug. 1, 2017, now Pat. No. 10,894,310, which is a continuation of application No. 13/671,002, filed on Nov. 7, 2012, now Pat. No. 9,776,315.

(60) Provisional application No. 61/579,738, filed on Dec. 23, 2011, provisional application No. 61/558,652, filed on Nov. 11, 2011.

(51) Int. Cl.
*B25F 3/00* (2006.01)
*B25F 5/02* (2006.01)

(52) U.S. Cl.
CPC ................ *B25F 3/00* (2013.01); *B25F 5/021* (2013.01)

(58) Field of Classification Search
CPC ............. B25F 3/00; B25F 5/021; B25B 23/18
USPC ............................................................ 173/29
See application file for complete search history.

(56) References Cited

U.S. PATENT DOCUMENTS 4,050,003 A * 9/1977 Owings ............... H01M 50/247 439/481
6,206,107 B1 * 3/2001 Wadge ...................... B25F 3/00 173/217
6,536,536 B1 * 3/2003 Gass ....................... B25F 5/021 173/171
9,776,315 B2 * 10/2017 Cannaliato .............. B25F 5/021

* cited by examiner

*Primary Examiner* — Veronica Martin
*Assistant Examiner* — Mary C Hibbert-Copeland
(74) *Attorney, Agent, or Firm* — Brake Hughes Bellermann LLP

(57) ABSTRACT

A power tool is provided which accommodates interchangeable tool heads. The power tool includes: a tool body having a housing and an electric motor mounted within the housing, as well as a tool head that releasably attaches via a mechanical connection and an electrical connection to the tool body. The tool releasably connects to the output shaft of the electric motor when the tool head is attached to the tool body.

20 Claims, 6 Drawing Sheets

POWER TOOL HAVING INTERCHANGEABLE TOOL HEADS

CROSS-REFERENCE TO RELATED APPLICATIONS

This application is a continuation of U.S. patent application Ser. No. 15/665,546, filed on Aug. 1, 2017 which claims priority to U.S. patent application Ser. No. 13/671,002, filed on Nov. 7, 2012, now U.S. Pat. No. 9,776,315 and claims the benefit of U.S. Provisional Application No. 61/579,738, filed on Dec. 23, 2011 and U.S. Provisional Application No. 61/558,652 filed on Nov. 11, 2011. The entire disclosures of each of the above applications are incorporated herein by reference.

FIELD

The present disclosure relates to a power tool which accommodates interchangeable tools heads.

BACKGROUND

As a result of considerable developments within the field of power tools and the increased demand of the do-it-yourself (DIY) market, the number of different types of power tool available to the consumer has risen considerably in the past decade. Even the most reluctant of DIY enthusiasts will own a power drill and jigsaw, whilst their more enthusiastic counterparts will also require electric sanders, power files, nibblers and other specialized power tools having dedicated purpose. Whilst this considerable array of power tools is often found to be useful, owning such a large number is both expensive and requires a considerable amount of storage space. In addition, having one specialized tool to perform each job often results in significant under-utilization of such a tool which are, generally, all operated by similar motors. Still further, many of today's power tools are "cordless", being battery powered by rechargeable batteries, often requiring the user to change the battery pack when changing dedicated tools, or have several ready-charged batteries available for different tools.

One approach to address this need has been to design a power tool system that accommodates interchangeable tool heads. The power tool system may include a tool body having a motor with a rotary output and one or more tool heads which detachable couple to the tool body, thereby forming an operational tool. Each tool head includes a tool, such as a drill chuck, a reciprocating saw or a detail sander, which operably couples to the rotary output of the motor. Upon actuation of a trigger switch, the motor is energized which in turn drives the tool. The tool head may further include a tool accessory, such as a work light or fan. Rather than activate the tool accessory using the trigger switch, it is desirable to provide a switch that independently activates the tool accessory integrated into the tool head.

This section provides background information related to the present disclosure which is not necessarily prior art.

SUMMARY

This section provides a general summary of the disclosure, and is not a comprehensive disclosure of its full scope or all of its features.

A power tool is provided which accommodates interchangeable tool heads. The power tool includes: a tool body having a housing and an electric motor mounted within the housing, as well as a tool head that releasably attaches via a mechanical connection and an electrical connection to the tool body. The tool head includes a tool and a tool accessory. The tool releasably connects to the output shaft of the electric motor when the tool head is attached to the tool body. A tool switch interposed between a power source for the electric motor and the electric motor is operable to supply power from the power source to the electric motor. A tool accessory switch interposed between the tool accessory and the power source for the electric motor is operable to supply power from the power source via the electrical connection to the tool accessory.

The electrical connection may be formed by an electrical connector integrated with the tool head and mated with an electrical connector integrated with the tool body. The electrical connection may include a first terminal electrically coupled to the tool accessory switch and a second terminal electrically coupled to the tool switch. The tool accessory switch may be integrated into either the tool head or the tool body.

The power tool may further include a controller disposed in the housing of the tool body and configured to receive an identifier for the tool head via the electrical connection from the tool head. The controller can adjust power output by the motor based on the identifier received from the tool head.

The power tool may also include a secondary tool switch interposed between the tool switch and the electric motor. In this case, the controller is electrically connected to the secondary tool switch and controls the secondary tool switch based on the identifier received from the tool head.

Further areas of applicability will become apparent from the description provided herein. The description and specific examples in this summary are intended for purposes of illustration only and are not intended to limit the scope of the present disclosure.

DRAWINGS

Figure 8A:
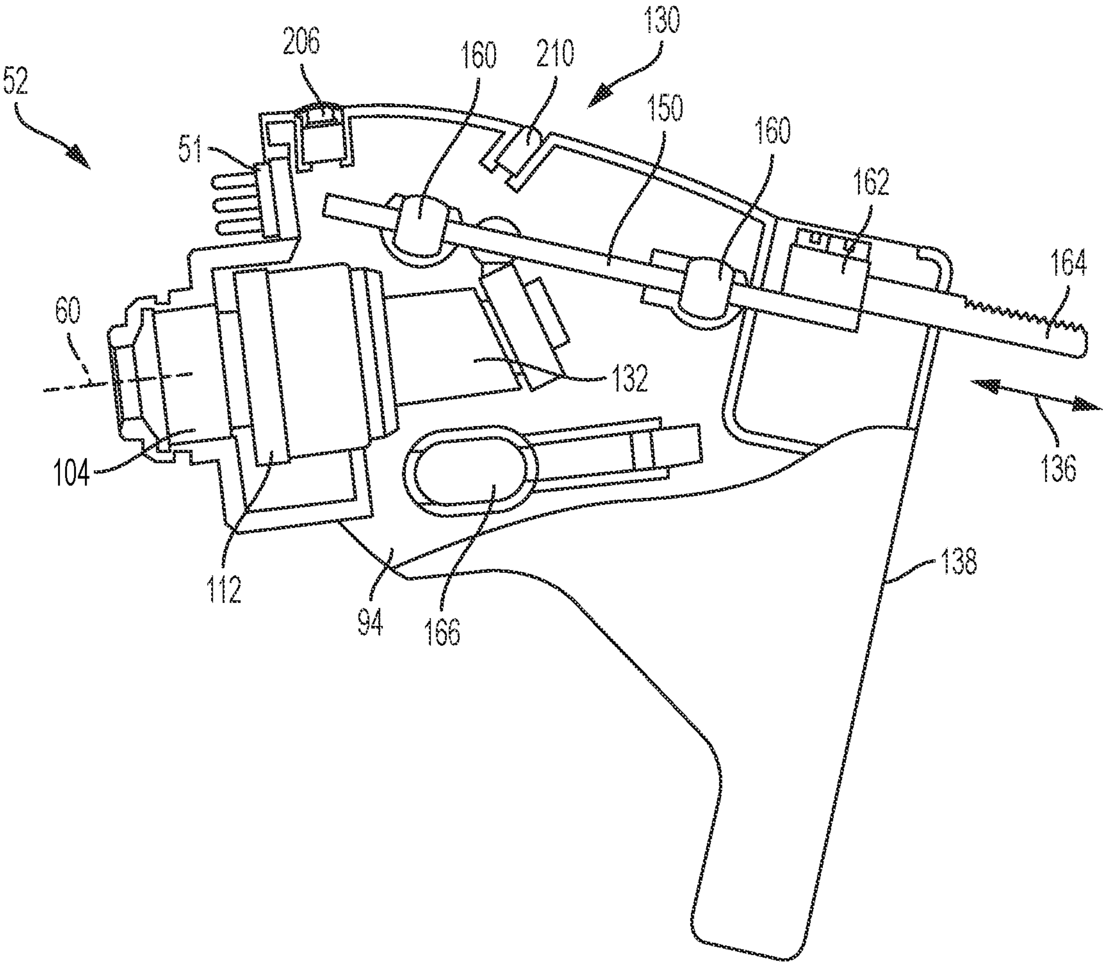
Figure 8B:
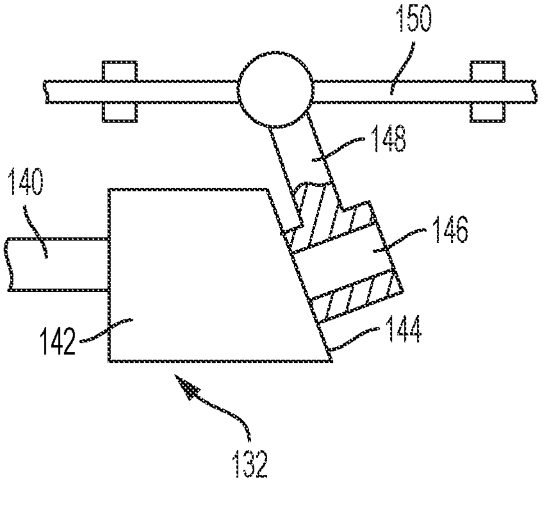

FIG. 8*a* is a side view of a reciprocating saw tool head with part clamshell removed;

FIG. 8*b* is a schematic view of the drive conversion mechanism of the reciprocating saw tool head of FIG. 8*a;*

Figure 9:
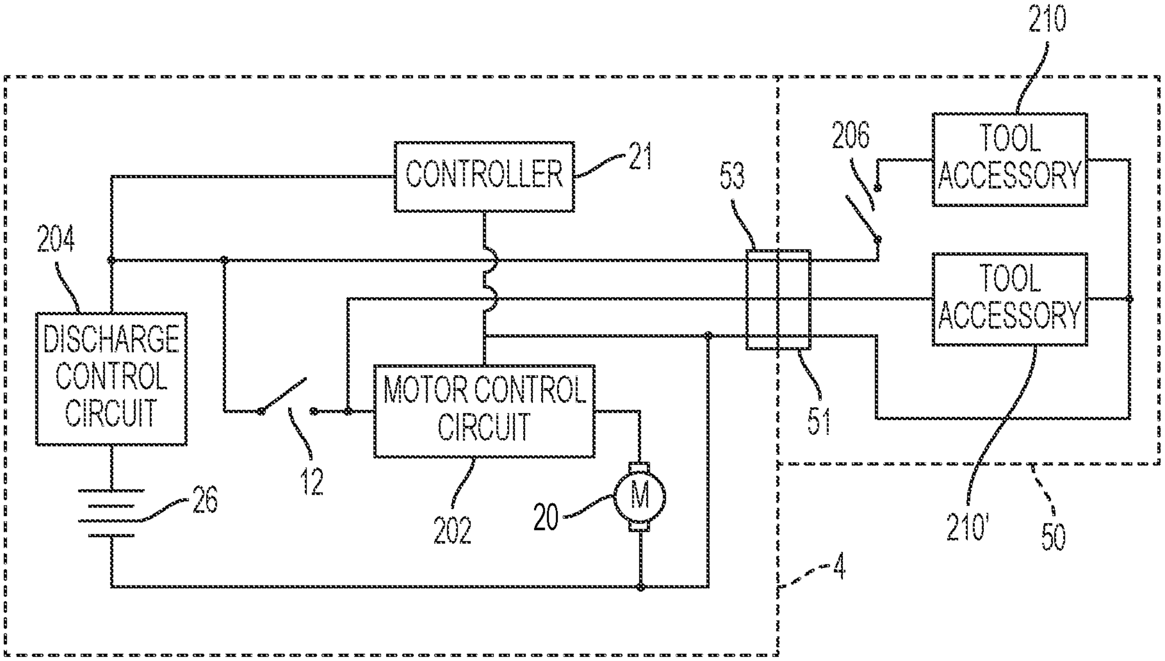
Figure 10:
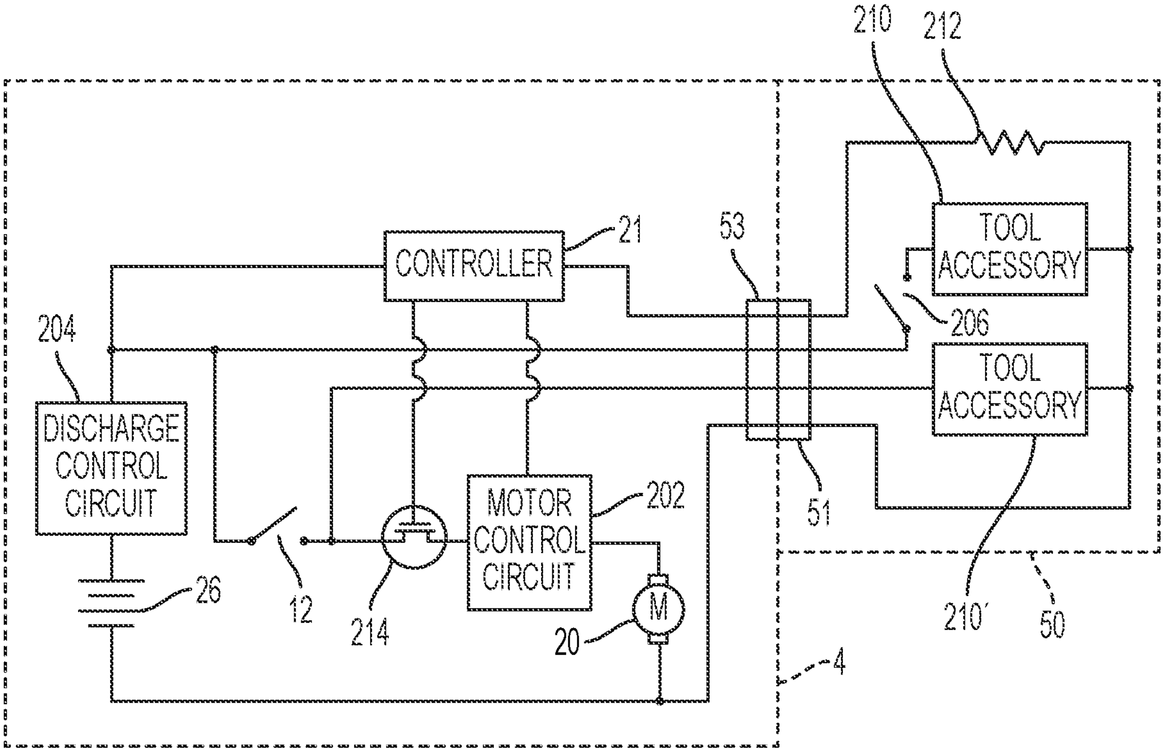

FIG. 9 is a schematic depicting electronic components in one embodiment of the power tool; and FIG. 10 is a schematic depicting electric components in an alternative embodiment of the power tool.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

Figure 1:
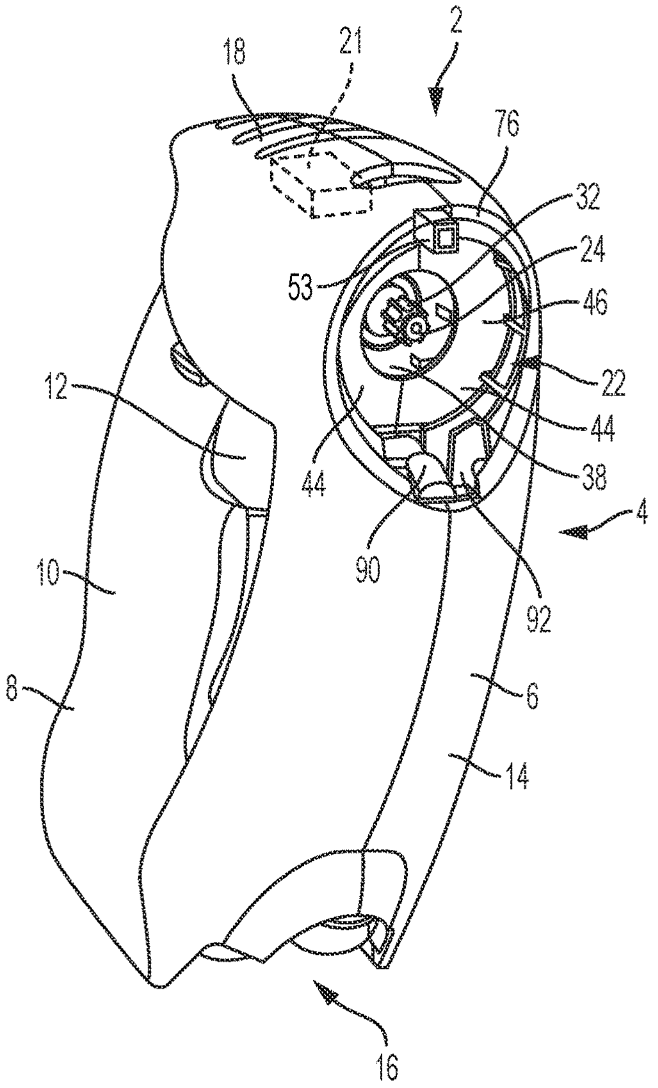
FIG. 1 shows a front perspective view of a body portion of a power tool in accordance with the present disclosure.

FIG. 1 depicts an exemplary power tool 2 comprised of a main body portion 4 conventionally formed from two halves of a plastic clamshell 6, 8. The two halves are fitted together to encapsulate the internal mechanism of the power tool to be described later. The body portion 4 defines a substantially D-shaped body, of which a rear portion 10 defines a conventional pistol grip to be grasped by the user. Projecting inwardly of this rear portion 10 is an actuating trigger 12 which may be operable by the users index finger in a manner conventional to the design of power tools. Such a pistol grip design is conventional and will not be described further in reference to this embodiment. The front portion 14 of the D-shape body serves a dual purpose in providing a guard for the users hand when gripping the pistol grip portion 10 and also serves to accommodate two batteries 26 (FIG. 5) to provide the power source for the tool 2. The two halves of the clamshell 6, 8 define an opening shown generally as 16, which allows the batteries to be inserted within the tool. Such batteries are releasably restrained within the body portion by a conventional means and it will be appreciated to those skilled in the art that the inclusion of removable batteries (or battery packs) within power tools is well known and the mechanisms used to restrain and release such battery systems are also well known. As such, the batteries per se do not form part of the present disclosure and will not be described in further detail for this present disclosure.

The body portion 4 has an enlarged upper body section 18 extending between the front and rear portions 10, 14 which houses the power tool motor 20. Again, the motor 20 employed for this power tool is a conventional electric motor and will not be described in detail herein save for general functional description. This upper body section 18 further comprises a substantially cylindrical opening 22 defined by two halves of the clamshell 6, 8 through which access to an output spindle 24 of the motor 20 is provided.

Figure 3:
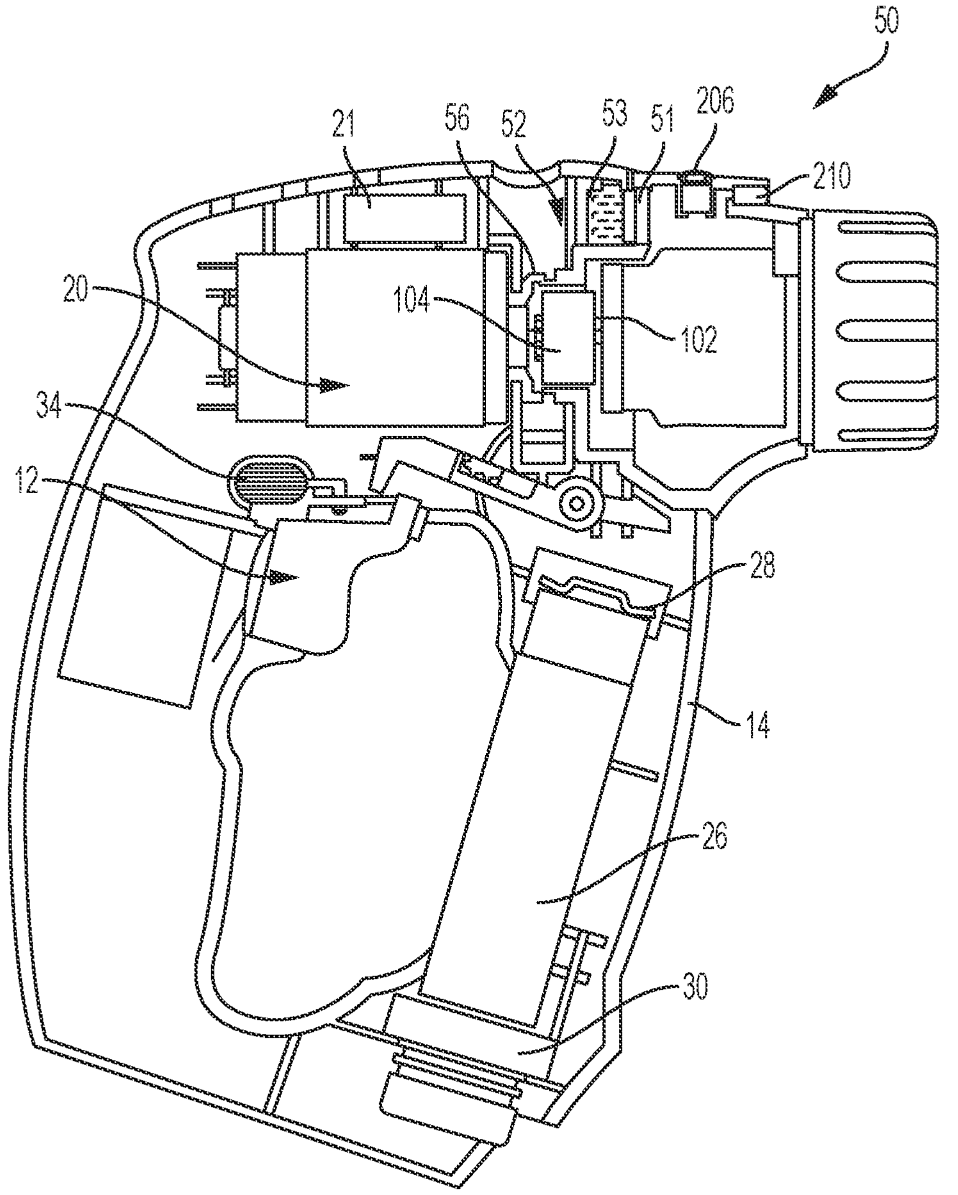
FIG. 3 shows a part cut-away side elevation of the body portion of FIG. 1 having a tool head attached thereto.
Figure 5:
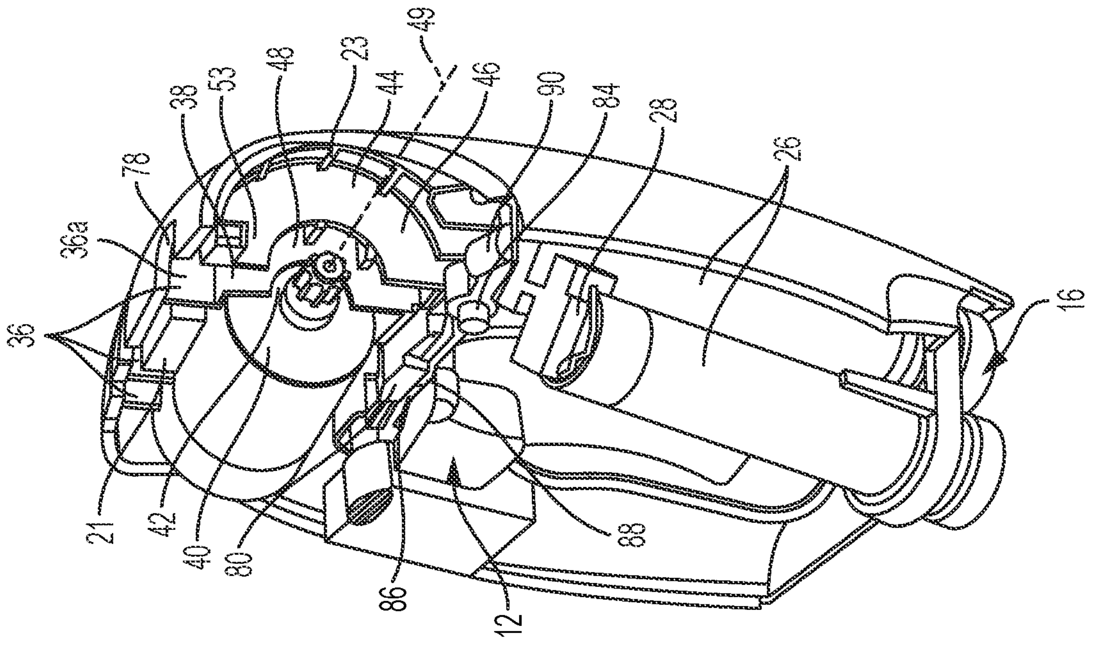
FIG. 5 is a perspective view of the body portion of FIG. 1 with half the clamshell removed.
Figure 4:
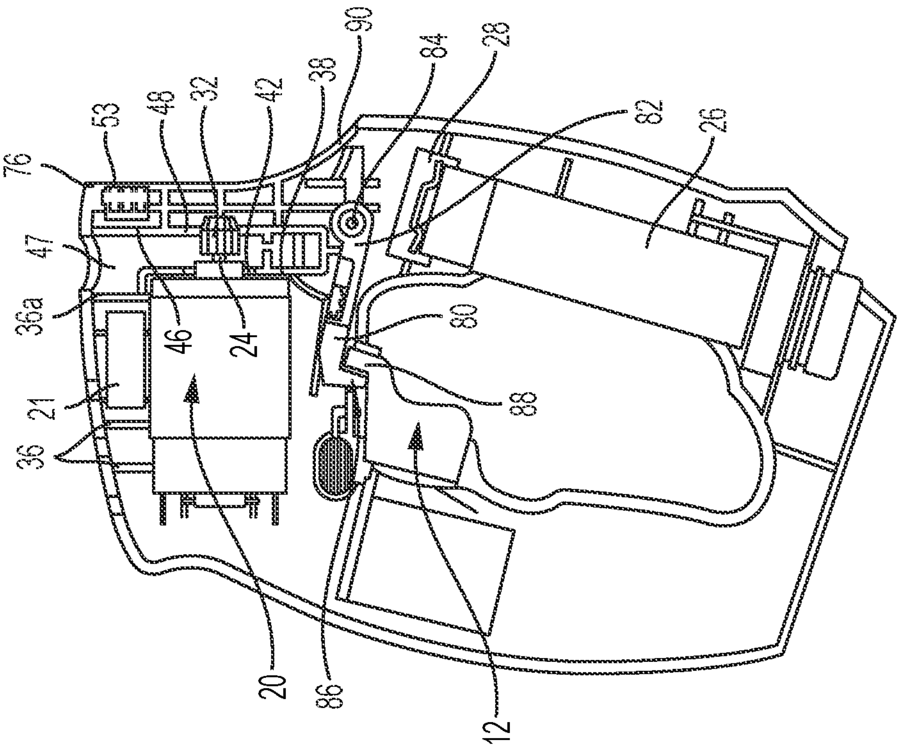
FIG. 4 shows the part cut away side elevation as shown in FIG. 3 with the tool head removed.

Referring now to FIGS. 3, 4 and 5 the internal mechanism of the tool 2 will be described in more detail. Two batteries 26 (only one of which is shown in FIGS. 3 and 4) are received through the battery opening 16 into the front portion 14 of the body 4 to electrically engage terminals 28. The batteries 26 are restrained within the tool body 4 by a detent mechanism 30 which is manually operable to facilitate removal of the batteries when so desired. Such a mechanism is conventional within the field of removable battery packs and will not be described further. The electrical terminals 28 are electrically coupled to the motor 20 via the trigger 12 in a conventional manner. (Note, for clarity in the drawings the electrical connections are not shown but comprise insulated wire connections of conventional design.) Upon actuation of the trigger 12 the user selectively couples the motor 20 to the batteries 26 thereby energizing the motor 20 which in turn rotates an output spindle 24 to provide a high speed rotary output drive.

The tool body 4 may optionally house a control module or controller. In an exemplary embodiment, the control module is implemented by a microcontroller 21. In other embodiments, the term control module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip.

As is conventional for modem power tools, the motor 20 is provided with a forward/reverse switch 34 which, on operation, facilitates reversal of the terminal connections between the batteries 26 and the motor 20 (via switch 12) thereby reversing the direction of rotation of the motor output as desired by the user. Again such a mechanism is conventional within the field of power tools.

Referring now to FIG. 5, which shows the power tool 2 having one of the clamshells 8 removed to show, in perspective the internal workings of the tool, it will be seen that the motor is supported by conventional clamshell ribs (shown generally at 36 and which are mirrored by compatible ribs on the clamshell 8) to restrain the motor within the clamshell. The foremost of these ribs 36*a* (FIG. 4) forms a front extension plate 38 (FIG. 5) which (in conjunction with the comparable front extension plate on the removed clamshell portion 8) substantially encloses the front of the motor 40 save for a circular aperture 42 through which the motor spindle 24 projects. The circular aperture 42 is co-axial with the motor spindle axis 49. The two clamshell halves 6, 8 further comprise two semi-circular plates 44 disposed forward of the front extension plate 38 and substantially parallel therewith to form a second, outer extension plate 46 again having a circular aperture 48 to facilitate access to the motor spindle 24. Both apertures 42 and 48 are disposed co-axially on the axis 49. As can be seen from FIG. 4 the two extension plates 38, 46 serve to define a chamber 47 about the spindle axis 49, externally accessible through the aperture 48 and which substantially houses the spindle cog 32.

Furthermore, the outer extension plate 46 is itself recessed within the cylindrical opening 22 (thus forming a substantially cylindrical chamber between the opening 22 and the plate 46) so that the spindle cog 32 does not project outwardly of the body portion 4. The power tool 2 further comprises a plurality of interchangeable tool head attachments (one of which is shown generally as 50 in FIG. 3) which are attachable to the body portion 4 to form a particular type of power tool having a dedicated function. This aspect of the disclosure will be described hereinafter, but for initial reference the particular types of tool head will include, amongst others, a conventional drill chuck, a reciprocating saw drive mechanism and a detail sander. Each of the tool head attachments will have a drive mechanism for engagement with the spindle cog 32 so that the motor 20 will drive the drive mechanism of each tool head.

Figure 2:
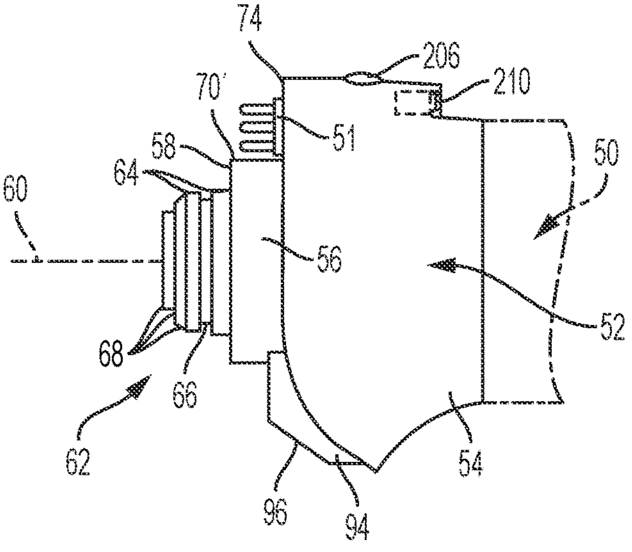
FIG. 2 shows a part side elevation of a tool head attachment mechanism.

Referring now to FIG. 2, each of the tool head attachments (referred to on 50) have a uniform connection system 52 shown in FIG. 2 in solid lines. This tool head connection system 52 comprises a substantially cylindrical outer body portion 54 which is ergonomically designed to match the exterior contours of the body portion 4 when the attachment is connected thereto. This outer body portion 54 design will vary for different types of tool head attachments (as will be seen later) and generally serves to provide a different profile to the power tool dependent on its particular function. The design shown in FIG. 2 is that intended for use with a drill chuck head attachment.

Extended rearwardly of this outer body portion 54 is a substantially cylindrical spigot 56 which is shaped so as to fit snugly within the cylindrical opening 22 of the body portion 4. As seen in FIG. 5, the cylindrical opening 22 of the body portion is defined by a series of inwardly directed ribs 23 forming a substantially cylindrical chamber. This cylindrical spigot 56 has a substantially flat circular rear wall 58 disposed about a head axis 60. Projecting rearwardly of this wall 58 so as to extend co-axially with the axis 60 is a second, substantially cylindrical and hollow spigot 62 having a diameter substantially less than the diameter of the spigot 56. This hollow spigot 62 has a series of exterior cylindrical ribs 64 which define an outer cylindrical recess 66. In addition, the spigot 62) has a gradually increasing exterior diameter formed by a series of chamfered steps shown generally at 68 inclined radially outward from the axis 60 in a direction from left to right as viewed in FIG. 2. These chamfered steps 68 provide inclined lead-in shoulders on the spigot 62 to form a generally tapered spigot. In addition, the spigot 56 also has a chamfered step 70 again forming an inclined lead-in cam surface.

Thus, as the tool attachment 50 is brought into engagement with the body portion 4, the connection system 52 is inserted into the cylindrical opening 22 of the body portion 4 for the tool attachment axis 60 to extend substantially co-axially with the spindle axis 49. As the connection system 52 passes into the cylindrical opening 22 the chamfered leading edge 70 may abut the ribs 23 so as to maintain the head attachment 50 co-axial with the spindle axis 49. As such, the lead-in edge 70 serves as a guide surface. Further insertion of the connection system 52 into the opening 22 will cause the hollow cylindrical spigot 62 to pass through the aperture 48 in the outer extension plate 46 so as to encompass the spindle cog 32.

The power tool 2 also provides an electrical connection between the body portion 4 and the tool head 50. A first electrical connector 53 is integrated into the body portion 4, for example protruding outwardly from the outer extension plate 46. In a reciprocating manner, a second electrical connector 51 is integrated into the tool head 50, for example protruding outwardly from rear wall 58. When the tool head 50 is attached to the body portion 4, the first electrical connector 53 is mated to the second electrical connector, thereby forming an electrical connection between the body portion 4 and the tool head 50. Accordingly, electric power can be delivered via the electrical connection to the tool head 50. Additional functionality can be added to the tool head 50. For example, the drill head attachment shown in FIG. 6 can include an LED worklight that can be powered via the electrical connection while rotary motion is delivered to the head drive spindle by the mechanical connection.

As can be seen from FIG. 3 the inner aperture 42 of the front extension plate 38 has a smaller diameter than the aperture 48 of the outer extension plate 46. Furthermore, the remote end 72 of the spigot 62 has a diameter corresponding substantially to the diameter of the aperture 42 whereas the inner diameter of the spigot 62 has a diameter corresponding to the diameter of the aperture 48. In this manner, as the tapered spigot 62 is inserted into the body portion 4 the spigot 62 will be received in a complimentary fit within the apertures 42 and 48 as shown in FIG. 3. In this manner the front extension plate 38 and outer extension plate 46 serve to firmly receive the spigot of the connection system 52 to restrain the connection system from axial displacement within the power tool body portion 4. Furthermore, this axial support of the connection system is assisted by the snug fit of the spigot 56 within the cylindrical opening 22. A shoulder portion 74 formed between the outer body portion 54 and the spigot 56 serves to restrain the connection system from further displacement of the connection system axially by its abutment against the outer rim 76 of the clamshell, as shown in FIG. 3.

To restrain the tool attachment 50 in connection with the body portion 4, the body portion 4 is further provided with a resiliently biased locking mechanism within the chamber 47 (defined between the front extension plate 38 and outer extension plate 46 (FIG. 4)). This locking means (which is not shown in the attached drawings) comprises a resilient mechanism comprising two resiliently biased spring wires and disposed symmetrically about the axis 60 which extend across the apertures 42 and 48 so that as the connection system 52 passes through the aperture 48 the chamfered steps 68 of the spigot 62 will engage the biased wires and deflect them out of the path of the cylindrical spigot 56. Further insertion of the spigot 62 into the body portion 4 will then enable these resiliently deflected wires to encounter the cylindrical recess 66 on the spigot 56 and, by returning to the resiliently biased position snap engage with this recess 66 to restrain the connection system 52 from further axially displacement. In addition this locking mechanism is provided with a conventional push button (not shown) which extends through an aperture 78 in the body 4 whereby actuation of this push button will cause the two wires to be pushed apart so that they are moved out of engagement with the cylindrical recess 66 in the connection system 52 to thereby release the tool attachment head 50 when required.

The power tool 2 is further provided with an intelligent lock-off mechanism (FIGS. 4, 5 and 6) which is intended to prevent actuation of the actuating trigger 12 when there is no tool head attachment 50 connected to the body portion 4. Such a lock-off mechanism serves a dual purpose of preventing the power tool from being switched on accidentally and thus draining the power source (batteries) whilst it also serves as a safety feature to prevent the power tool being switched on when there is no tool head attached which would present a high speed rotation of the spindle cog 32 (at speeds approaching 15,000 rpm) which could cause serious injury if accidentally touched.

The lock-off mechanism 80 comprises a pivoted lever switch member 82 pivotally mounted about a pin 84 which is moulded integrally with the clamshell 6. The switch member 82 is substantially a elongate plastics pin having at its innermost end a downwardly directed projection 86 which is biased (by a conventional helical spring, not shown) in a downwards direction to the position as shown in FIG. 4 so as to abut the actuating trigger 12. The actuating trigger 12 comprises an upstanding projection 88 presenting a rearwardly directed shoulder which engages the pivot pin projection 86 when the lock-off mechanism 80 is in the unactuated position (FIG. 4).

In order to operate the actuating trigger 12 it is necessary for the user to depress the trigger 12 with their index finger so as to displace the trigger switch 12 from right to left as viewed in FIG. 4. However, the abutment of the trigger projection 88 against the projection 86 of the lock-off mechanism restrains the trigger switch 12 from displacement in this manner.

The opposite end of the switch member 82 has an outwardly directed cam surface 90 being inclined to form a substantially wedge shaped profile as seen in FIG. 4.

Referring now to FIG. 1 it is seen that the two halves of the clamshell 6 and 8 in the region of the cylindrical opening 22 form a substantially rectangular channel 92 (in cross-section) extending downwardly from the periphery of this cylindrical opening 22 and which is shown generally as 92. The cam surface 90 is received within this channel 92 so as to be presented outwardly of the body portion 4 (FIG. 1).

Referring now to FIG. 2 the tool attachment 50 has an additional projection 94 which is substantially rectangular in cross-section and presents an inclined cam surface 96 which is inclined radially outwardly from the axis 60 in a direction away from the spigot 62. This projection 94 has a cross-sectional profile compatible with the rectangular channel 92 of the body 4 and is designed to be received therein. This projection 94 thus serves a dual purpose (i) as an orientation mechanism requiring the tool head to be correctly orientated about its axis 60 relative to the body portion 4 in order that this projection 94 is received within the rectangular channel 92 (which thus serves to position the tool head in a pre-determined alignment relative to the body portion) whilst (ii) the cam surface 96 serves to engage the cam surface 90 of the lock-off mechanism 80 so that continued displacement of the tool attachment 50 towards the body portion 4 causes cam engagement between the cam surfaces 96 and 90. This cam engagement causes pivotal deflection of the switch member 82 about the pin 84, (against the resilient biasing of the helical spring (not shown)) and to thus move the projection 86 in an upwards direction (to the actuated position as shown in FIG. 3), thus moving this projection 86 out of engagement with the trigger projection 88 which thus allows the actuating trigger 12 to be displaced as required by the user to switch the power tool on as required. This attachment of the tool head automatically de-activates the lock-off mechanism.

Furthermore, for certain tool head attachments a manual, and not automatic, de-activation of the lock-off mechanism. For example, when the tool attachment 50 comprises a reciprocating saw head the projection 94 as shown in FIG. 2 remains substantially hollow with a front opening to pass over the cam surface 90 so that no cam surface 96 is presented by such a tool head attachment. In such a situation as the tool head attachment 50 is connected to the body portion 4 as previously described the projection 94 serves to orientate the tool head in the correct orientation relative to the tool body by being received within the channel 92, but such projection 94 is simply received over the switch member cam surface 90 so that this switch member is not actuated, thus leaving the lock-off mechanism in engagement with the trigger switch to prevent accidental activation of this trigger 12.

The reciprocating saw tool head is then provided with a manually operable switch member (not shown) which comprises a cam surface (similar to cam surface 96 as previously described) compatible with the cam surface 90. Operation of this switch member services to displace the compatible cam surface through the projection 94, into engagement with the cam surface 90 when the tool head is attached to the body portion 4 serving to pivotally displace the lock-off mechanism 80 in a manner previously described, so as to release the trigger switch 12. This manually operable switch will be resiliently biased away from the body portion 4 so that once it has been used to de-activate the lock-off mechanism and the trigger switch 12 displaced so as to activate the power tool, the manually operable switch is released and thus disengages the cam surface 90 whereby the downwardly directed projection 86 of the switch member 82 would then biased towards engagement with the trigger projection 88. However, at this time since the trigger switch 12 will have been displaced from right to left as shown in FIG. 3, the projection 86 will abut an upper surface of the trigger projection 88 while the tool is in use. When the user has finished use of the tool the trigger 12 will be released (and moved from left to right under conventional spring biasing means common to the art) which will then allow the downwardly biased projection 86 to re-engage the shoulder of the trigger projection 88 to restrain the actuating trigger from further activation as previously described. Therefore, if the user wishes to again activate the tool with the reciprocating saw tool head he must manually displace the switch on the tool head so as to de-activate the lock-off mechanism as previously described. This provides the safety feature that when a saw head attachment is connected to the body portion 4 the actuating trigger 12 may not be accidentally switched on. This provides tool heads with automatic or manually operable means for de-activating the lock-off mechanism, i.e. an intelligent lock-off mechanism which is able to identify different tool head functions, and is able to identify situations whereby manual de-activation of the lock-off mechanism is required.

Referring now to FIG. 3, each of the tool head attachments 50 will have a drive spindle 102 to which is coupled, at its free end, a female cog member 104 which is designed to engaged with the male cog 32 from the motor output spindle 24 (FIG. 4). It will be appreciated that when the male and female cogs of the motor spindle 24 and the drive spindle 102 mate together when the tool head attachment 50 is connected to the body 4, then actuation of the motor 20 will cause simultaneous rotation of the head drive spindle 102 therefore providing a rotary drive to the tool head drive mechanism (to be described later).

As can be seen from FIG. 3, which includes a side elevation of a tool head 50 (in this example a drill chuck) it is clearly seen that the female cog member 104 is wholly enclosed within the cylindrical spigot 56 of the connection system 52. As previously described this cylindrical spigot 56 has a cylindrical end opening to receive the male cog 32 of the motor spindle 24 (as seen in FIG. 3). In addition as can be seen from FIGS. 1 and 4 the male cog 32 is recessed within the tool body 4 and is accessible only through the cylindrical opening 22 and the aperture 48. In this manner both of the male and female cogs have severely restricted access to alleviate damage to these potentially delicate parts of the connection mechanism. In particular the male cog 32 is directly attached to the motor spindle and a severe blow to this spindle could damage the motor itself whereby recessing the cog 32 within the tool body 4 the cog itself is protected from receiving any direct blows, for example if the tool body was dropped without a head attachment. Furthermore, by recessing this cog within the tool body (and in the situation whereby the lock-off mechanism was deliberately de-activated—for example by use of a member pushed against the cam surface 90 then even if the motor was able to be activated, the high speed rotation of the cog 24 would not be easily accessible to the user who would thus be protected from potential injury. Thus, by recessing the male and female cogs within the clamshells of the body and the head respectively these delicate parts are protected from external damage which may occur in the work environments in which they are used.

Still further, by positioning the female cog 104 within the cylindrical spindle 56 it is automatically aligned substantially with the axis 60 of the tool head 50 which is then automatically aligned with the axis 49 of the motor spindle 24 by virtue of the alignment of the spigot 56 within the aperture 48 so that male and female cog alignment is substantially automatic upon alignment of the tool head with the tool body.

Figure 6:
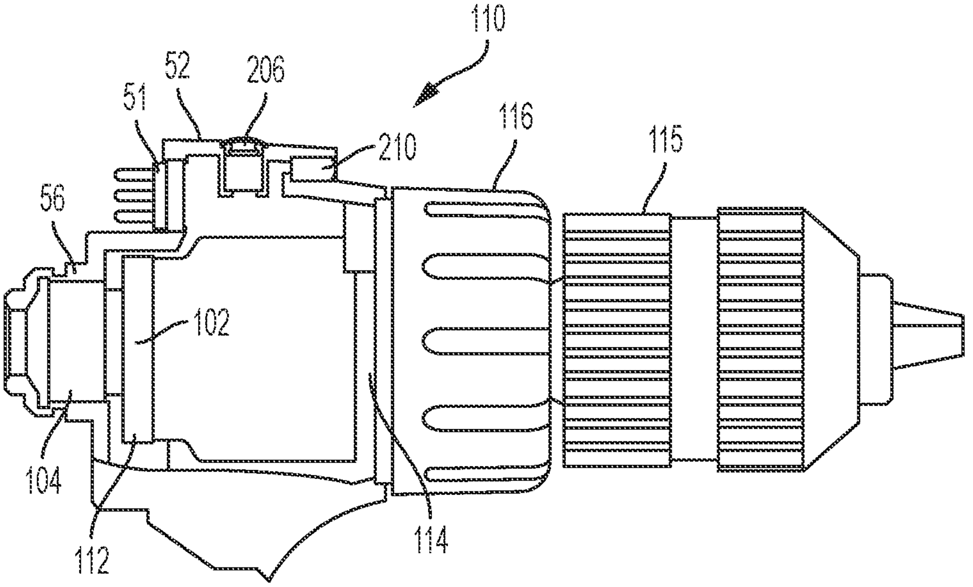
FIG. 6 is a side elevation of a drill chuck tool head with part clamshell removed.
Figure 7:
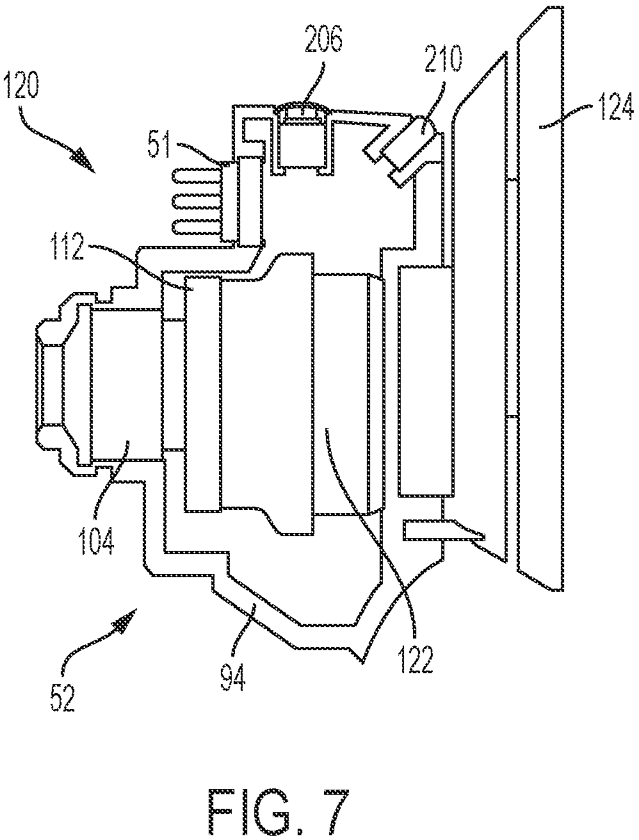
FIG. 7 is a side elevation of a detailed sander tool head with part clamshell removed.

Referring now to FIGS. 6, 7 and 8, three specific tool head attachments are shown. FIG. 6 shows a drill tool head attachment (corresponding to that shown in FIG. 3 generally at 50 with the clamshell portion of the connection system 52 half removed to show, schematically, the drive mechanism of this drill tool head. As previously described, this drill tool head has a connection system 52 having a cylindrical spigot 56 which connects with the tool body 4 as previously described. Housed within the spigot 56 is the head drive spindle 102 having connected thereon a female cog member 104 for engagement with the male cog 32 connected to the motor spindle 24. The drive spindle 102 has an inner drive cog (not shown) which is designed to drive a conventional sun and planet gear reduction mechanism illustrated generally as 112. To those skilled in the art, the use of a sun and planetary gear reduction mechanism is standard practice and will not be described in detail here save to explain that the motor output generally employed in such power tools will have an output of approximately 15,000 rpm whereby the gear and planetary reduction mechanism will reduce the rotational speed of the drive mechanism to that required for this specific tool function. In the particular case of a conventional drill this first gear reduction mechanism will have an output of approximately 3,000 rpm, which is then used as an input drive to a second sun and planet gear reduction mechanism to provide a final rotary output of approximately 800 rpm. The exact ratio of gear reduction will be dependent on the number of teeth on the cogs employed in the gear arrangement. The output drive 114 of this gear reduction mechanism 112 then drives a conventional drill chuck 115 in a manner conventional to those skilled in the art. In the particular drill head shown as 110 a clutch mechanism shown generally as 116 (which is again conventional for electric drills and will not be described in any detail here) is disposed between the gear reduction mechanism and the drill chuck. When this drill head attachment is connected to the tool body, the power tool 2 acts as a conventional electric drill with the motor output drive driving the gear reduction mechanism via the male/female cog connection 32, 104. The drill head attachment further includes an LED worklight 117 and a tool accessory switch 118. The worklight 117 is powered via the electrical connection and may be activated using either the trigger switch 12 or the tool accessory switch 118 as further described below. It is readily understood that the drill head attachment may be equipped with other types of accessories, such as a live wire detection circuit.

Referring now to FIG. 7, which shows a detail sander tool head 120 one half of the clamshell is removed to allow the drive mechanism is to be shown schematically. This tool head 120 has the connection system 52 as previously described together with the cam projection 94 required for de-activation of the lock-off mechanism as previously described. However, it will be noted here that the outer peripheral design of this tool head varies to the drill tool head 110 but is again designed to be flush fit with the body portion 4 so as to present a comfortable ergonomic design for a detailed sander once this head is connected to the body. To this end, each of the tool head clamshell designs ensures that once that tool head is connected to the tool body, then the overall shape of the power tool is ergonomically favourable to the function of that power tool to allow the tool to be used to its maximum efficiency.

Again, the detailed sander tool head 120 has a drive shaft with female cog member 104 which again is connected to a conventional gear reduction mechanism 112 (conventional sun and planet gear reduction mechanism) to provide a rotary output speed of approximately 3,000 rpm. The gear reduction output 122 is then employed to drive a conventional eccentrically driven plate on which the detailed sander platen 124 is mounted. The gear reduction and drive mechanism of the tool head 120 is conventional to that employed in a detail sander having an eccentrically driven platen. As such, this drive mechanism will not be described herein in any detail since it is commonplace in the art. The sander tool head attachment 120 further includes an LED worklight 125 and a tool accessory switch 126. The worklight 125 is powered via the electrical connection and may be activated using either the trigger switch 12 or the tool accessory switch 126 as further described below. It is readily understood that the sander tool head attachment may be equipped with other types of accessories, such as a fan or dust blower.

FIG. 8A shows a reciprocating saw tool head attachment 130 having the conventional connection system 52 connection with the tool body 4. Again the tool connection system 52 will house the drive spindle 102 with female cog member 104 connected to a gear reduction mechanism 112 to reduce the speed of the head drive mechanism to approximately 3,000 rpm. The gear reduction mechanism 112 then has a rotary output connected to a drive conversion mechanism shown generally at 132 which is used to convert the rotary output of the gear reduction mechanism to linear motion to drive the saw blade 134 in a linear reciprocating motion indicated generally by the arrow 136. Whilst is can be seen from FIG. 8A that this reciprocating motion is not parallel with the axis of the tool head, this is merely a preference for the ergonomic design of this particular tool head 130 although, if necessary, the reciprocating motion could be made parallel with the tool head (and subsequently motor drive) axis 60. The tool head 130 itself is a conventional design for a reciprocating or pad saw having a base plate 138 which is brought into contact with the surface to be cut to stabilize the tool (if required) and again the exterior shape of this tool head has been chosen for ergonomic preference.

The drive conversion mechanism 132 utilizes a conventional reciprocating space crank illustrated, for clarity, schematically in FIG. 8B. The drive conversion mechanism 132 will have a rotary input 140 (which for this particular tool head will be the gear reduction mechanism output at a speed of approximately 3,000 rpm and which is co-axial with the axis of rotation of the motor of the tool itself). The rotary input 140 is connected to a link plate 142 having an inclined front face 144 (inclined relative to the axis of rotation of the input). Mounted to project proud of the surface 144 is a tubular pin 146 which is caused to wobble in reference to the axis of rotation of the input 140. Freely mounted on this pin 146 is a link member 148 which is free to rotate about the pin 146. However, this link member 148 is restrained from rotation about the drive axis 140 by engagement with a slot within a plate member 150. This plate member 150 is free (in the embodiment of FIG. 8*a*) to move only in a direction parallel with the axis of rotation of the input 140. Thus, the wobble of the pin 146 is translated to linear reciprocating motion of the plate 150 via the link member 148. This particular mechanism for converting rotary to linear motion is conventional and has only been shown schematically for clarification of the mechanism 132 employed in this particular saw head attachment 130.

In the saw head 130 the plate 150 is provided for reciprocating linear motion between the two restraining members 160 and has attached at a free end thereof a blade locking mechanism 162 for engaging a conventional saw blade 164 in standard manner. Thus the tool head 130 employs both a gear reduction mechanism and a drive conversion mechanism for converting the rotary output of the motor to a linear reciprocating motion of the blade.

Furthermore, the reciprocating saw tool head 130 has a projection 94 for orientating the tool head 130 relative to the body of the power tool 4. However, as previously described, this projection 94 (for this particular tool head) is hollow so as not to engage the cam surface 90 of the lock-off mechanism 80. This tool head is then provided with an additional manually operable button 166 which, on operation by the user, will enable a spring biased member (not shown) to pass through the hollow projection 94 when the head 130 is attached to the body 4 so as to engage the cam surface 90 of the lock-off mechanism 80 to manually de-activate the lock-off mechanism when power is required to drive the reciprocating saw (as previously described).

The reciprocating saw tool head 130 further includes a laser 168 and a tool accessory switch 169. The laser 168 serves as a guide or alignment feature for the blade on the workpiece. The laser 168 is powered via the electrical connection and may be activated using either the trigger switch 12 or the tool accessory switch 169 as further described below. It is readily understood that the reciprocating saw tool head attachment may be equipped with other types of accessories, such as a fan or dust blower.

Although three specific tool head embodiments have been shown in FIGS. 6, 7 and 8, the present disclosure is by no means limited to three such tool heads. In particular, a complete range of tool head attachments may be connected to the tool body to obtain a functional tool which is currently available as an existing single function power tool. Exemplary head attachments include but are not limited to an oscillating head, a hammer drill, a trim saw, an inflator, scissors, a flashlight, a scrubber, a router, a hedge trimmer, a string trimmer, etc. It will be appreciated by those skilled in the art that the particular embodiments of the tool head attachment described herein are by way of example only and merely serve to describe tool head attachments which employ (i) no gear reduction or drive conversion mechanisms, (ii) those which have simple gear reduction mechanisms and (iii) those which have both gear reduction and drive conversion mechanism for converting the rotary to non-rotary output. Thus, a power tool system is provided which provides for a plurality of power tool functions having different output functions, all driven by a single speed motor.

Furthermore, it will be appreciated that the drive conversion mechanisms described with reference to the tool heads described herein are conventional and provided by way of example only. It will be appreciated that any conventional drive conversion mechanism for converting rotary to linear reciprocating motion may be used in place of those systems described herein. Furthermore, alternative gear reduction mechanisms may be utilized to replace the conventional sun and planet gear reduction mechanisms referred to for these particular embodiments.

In addition, whilst the specific embodiments of the tool have referred to the power source as batteries, and such batteries may be conventional or rechargeable, it will also be appreciated that the present disclosure will relate to a power tool having a conventional mains input or for use with alternative heavy duty battery packs.

While reference has been made to a particular power tool, it is understood that the concepts described herein are also extendable to other types of power tools having interchangeable tool heads. For example, it is readily understood how the connection scheme could be adapted for use in a drill having a conventional pistol grip configuration. Such an exemplary power tool is described in commonly owned U.S. patent application Ser. No. 13/530,629 which was filed on Jun. 22, 2012 and is incorporated herein by reference.

Electronic components of the power tool 2 are further described in relation to FIG. 9. In an exemplary embodiment, the tool body 4 houses the electric motor 20, a motor control circuit 202, batteries 26, a discharge control circuit 204, a trigger switch 12 and a controller 21. During operation, the motor drive circuit 202 enables voltage from the batteries 26 to be applied across the motor 20 in either direction. The motor 20 in turn drives the output spindle 24. In the exemplary embodiment, the motor drive circuit 202 is an H-bridge circuit arrangement although other circuit arrangements are contemplated. Although a few of the primary components of the power tool 2 are discussed herein, it is readily understood that other components may be needed to construct the power tool 2.

Electric power may also be supplied from the tool body 4 via an electrical connection to an attached tool head. Electrical connector 53 mates with electrical connector 51 when the tool head 50 is attached to the tool body 4, thereby forming the electrical connection. In an exemplary embodiment, the electrical connectors 51, 53 provide three pins or terminals although connectors having more or less pins are contemplated by this disclosure. Electric power can be delivered via the electrical connection to the tool head 50, thereby enabling additional functionality to be integrated into the tool head 50.

In the exemplary embodiment, a tool accessory switch 206 enables the tool operator to independently activate one or more tool accessories integrated into the tool head 50. To do so, the tool accessory switch 206 is interposed between the power source (i.e., batteries 26) and a tool accessory 210. The tool accessory switch 206 is preferably implemented by a non-momentary or latching switch. One terminal of the tool accessory switch 206 is electrically coupled to the discharge control circuit 204; whereas, the other terminal of the tool accessory switch 206 is electrically coupled to the tool accessory 210. In the exemplary embodiment, the tool accessory switch 206 is mounted on the tool head 50. In other embodiments, the tool accessory switch 206 may optionally be disposed on the tool body 4.

Upon actuation of the tool accessory switch 206, the switch 206 closes and power is delivered from the power source to the tool accessory 210. The tool accessory 210 remains activated until the tool accessory switch 206 is actuated a second time. In this way, the tool accessory switch 206 enables the tool accessory 210 to be activated independently from the tool (e.g., drill bit). Additionally, type of tool accessory switch 206 (and its location) can be tailored to the type of accessory being controlled. For example, it may be preferable to use a momentary switch for some types of accessories. To the extent that more than one tool accessory is integrated into the tool head 50, a separate accessory switch may be used for each of the different accessories.

In some embodiments, it may be preferable to activate the accessory 210' using the trigger switch 12. In this case, a second terminal of the electrical connectors 51, 53 can be used to supply power from a terminal of the trigger switch 12 to the tool accessory 210'. Upon actuation of the trigger switch 12, the switch 12 closes and power is delivered to the tool accessory 210' as well as to the motor 20. For example, the saw tool attachment 130 may include a laser that serves as a guide or alignment feature for the blade on the workpiece. In this example, the laser may be activated by the trigger switch 12 rather than an independent accessory switch. When the trigger switch is released, the switch 12 is opened and power is no longer delivered to the tool accessory 210'.

With reference to FIG. 10, the electrical connection may further include a data terminal 211 coupled between the tool body 4 and the tool head 50. In some embodiments, the data terminal may be established through a separate connection or connector. The data terminal 211 may be used to communicate data about the tool head 50 to the controller 21 of the power tool. For example, because the tool body 4 can be interfaced with many different types of tool heads 50, the data terminal may be used to provide an indicator for the type of tool head (i.e., drill head, sander head, saw, inflator, etc.) and/or various operating parameters. Operating parameters may include but are not limited to whether the power tool head require electricity from the electrical connection, a mechanical rotational input from the motor through the mechanical connection or both, the speed or range of speeds for operating the motor and the torque or range of torques for the motor. It is envisioned that other types of data may be communicated via the data terminal between the tool body 4 and the tool head 50.

In an exemplary embodiment, a resistor 212 may be used to identify the type of tool head. The resistor 212 is electrically coupled via the data terminal to the controller 21 of the power tool. Different types of tool heads will be configured with resistors having different resistance values. By determining the resistance value of the resistor 212, the controller 21 can determine the type of tool head. Other techniques for identifying the type of tool head, such as a magnet, a memory unit or a mechanical feature, also fall within the broader aspects of this disclosure.

Depending on the tool head type, the tool may operate differently. For example, the controller 21 may adjust the power output by the motor 20 based on the type of tool head. Assuming 20 volts of available power, the controller 21 may interface with the motor control circuit 202 such that all of the available power (e.g. 20 volts) is applied to the motor 20 when the type of tool is a router. In contrast, the controller 21 may interface with the motor control circuit 202 to reduce the voltage applied to the motor to 14 volts for a different type of tool, such as a drill. In other words, the motor output can be optimized or tailored to the desired performance of the respective tool head. Techniques for controlling motor output of an electric motor are readily understood in the art.

Certain types of tool heads may not include tools which are driven by the motor. For example, the tool head 50 may include a live wire detection circuitry and/or stud detection circuitry (not shown). In this example, there is no need to drive the motor 20 but it may be desirable to activate these detection functions using the trigger switch 12. To accommodate such tool heads, the tool body 4 may be equipped with a secondary tool switch 214 (e.g., a FET) placed in series with the trigger switch 12. The controller 21 can be electrically connected to a control terminal of the secondary tool switch 214 to open or close the switch. In operation, the controller 21 determines the type of tool head in the manner set forth above and controls the secondary tool switch 214 based on the type of tool head attached to the tool body 4. For tools heads which do not require use of the motor, the controller 21 opens the secondary tool switch 214; otherwise, the secondary tool switch 214 remains closed. Upon actuation of the trigger switch 12, power is supplied via the second terminal to a tool accessory 210' (i.e., detection circuitry), but not to the motor 20. In this way, the trigger switch can be used to activate the functions in the tool head 50 while the motor is not driven unnecessarily.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power tool, comprising:

a tool body having a housing and an electric motor mounted within the housing, the electric motor having a rotatable output shaft;

a tool head releasably attachable via a mechanical connection and an electrical connection to the tool body, the tool head operably connects to the rotatable output shaft of the electric motor when the tool head is attached to the tool body;

a trigger switch on the housing of the tool body, the trigger switch configured to control operation of the electric motor;

a controller disposed in the housing, the controller configured to identify a type of the tool head and control output power of the electric motor based on the type of the tool head, in response to actuation of the trigger switch; and a battery connector mounted to the tool body and configured to transfer power from a rechargeable battery pack to the electric motor, wherein the mechanical connection comprises a tool body rotational member and a tool head rotational member.

2. The power tool of claim 1, wherein the electrical connection is formed by a tool head electrical connector integrated with the tool head and mated with a tool body electrical connector integrated with the tool body.

3. The power tool of claim 2, wherein the tool body electrical connector includes one of at least three pins or at least three terminals.

4. The power tool of claim 3, wherein the tool head electrical connector includes an other of the at least three pins and the at least three terminals.

5. The power tool of claim 1, wherein the tool head comprises at least one of a drill head and a saw head.

6. The power tool of claim 1, wherein the controller is configured to identify the type of the tool head based on an identifier for the tool head received via the electrical connection from the tool head.

7. The power tool of claim 1, wherein the tool head includes an identifying resistor, the identifying resistor having a resistance value associated with the type of the tool head, and wherein the controller is configured to identify the type of the tool head by determining the resistance value.

8. The power tool of claim 1, wherein at least one of the tool body rotational member and the tool head rotational member comprises a male cog.

9. The power tool of claim 8, wherein the male cog includes a plurality of splines and the plurality of splines are parallel to one another.

10. A power tool, comprising:

a tool body having a housing and an electric motor mounted within the housing, the electric motor having a rotatable output shaft;

a tool head releasably attachable via a mechanical connection and an electrical connection to the tool body, the tool head including an identifier associated with a type of the tool head, the tool head operably connects to the rotatable output shaft of the electric motor when the tool head is attached to the tool body; and a controller in the tool body configured to identify a type of the tool head based on the identifier, wherein the mechanical connection comprises a tool body rotational member and a tool head rotational member.

11. The power tool of claim 10, wherein the tool body rotational member comprises a plurality of splines.

12. The power tool of claim 11, wherein the tool head rotational member includes a plurality of splines.

13. The power tool of claim 12, wherein the plurality of splines of the tool head rotational member are configured to operably engage with the plurality of splines of the tool body rotational member.

14. The power tool of claim 10, wherein controller is further configured to control an amount of voltage provided to the electric motor based on the type of the tool head.

15. The power tool of claim 10, wherein the electrical connection is formed by a tool head electrical connector integrated with the tool head and mated with a tool body electrical connector integrated with the tool body, wherein the tool body electrical connector includes at least three tool body electrical connectors, and wherein the tool head electrical connector includes at least three tool head electrical connectors.

16. A power tool, comprising:

a tool body having a housing and an electric motor mounted within the housing;

a tool head releasably attachable via a mechanical connection and an electrical connection to the tool body; and a controller disposed in the housing and configured to control output power of the electric motor based on a type of the tool head, wherein the electrical connection is formed by a tool head electrical connector integrated with the tool head and mated with a tool body electrical connector integrated with the tool body;

wherein the mechanical connection is configured to transfer rotary power from the electric motor to the tool head via engagement of a tool body rotational member with a tool head rotational member.

17. The power tool of claim 16, further comprising a motor control circuit in the tool body, wherein the controller is further configured to identify the type of the tool head based on an identifier associated with the tool head, and wherein the controller is configured to control output power of the electric motor via the motor control circuit.

18. A power tool, comprising:

a tool body having a housing and an electric motor mounted within the housing, the electric motor having a rotatable output shaft;

a battery connector configured to transfer power from a removable battery pack to the electric motor;

a tool head releasably attachable to the tool body by at least a mechanical connection;

a controller disposed in the housing of the tool body, the controller configured to identify a type of the tool head and control output power of the electric motor based on the type of the tool head; and an electrical connection between the tool head and the tool body, the electrical connection configured to provide a connection for electric power from the removable battery pack to the tool head;

wherein the electrical connection includes a data terminal between the tool head and the tool body which provides an indicator related to the type of the tool head to the controller, and wherein the mechanical connection comprises engagement of a tool head rotary member and a tool body rotary member through which rotary power from the rotatable output shaft is transferred.

19. The power tool of claim 18, wherein the controller is configured to adjust operating parameters of the power tool based on information regarding the tool head relayed through the data terminal.

20. The power tool of claim 18, wherein the tool head comprises at least one of a drill tool head, a saw tool head, and a sander tool head.

* * * * *